United States Patent
Morales

(10) Patent No.: US 8,134,733 B2
(45) Date of Patent: Mar. 13, 2012

(54) PRE-CONCATENATION EXECUTION METHOD AND SYSTEM FOR AUTOMATED PREPRESS PROCESS NODES

(75) Inventor: Javier A. Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 504 days.

(21) Appl. No.: 12/429,575

(22) Filed: Apr. 24, 2009

(65) Prior Publication Data

US 2010/0271657 A1    Oct. 28, 2010

(51) Int. Cl.
*G06F 3/12*      (2006.01)
*G06F 3/048*    (2006.01)
*G06K 15/00*   (2006.01)
*H04N 1/46*    (2006.01)
*H04N 1/409*   (2006.01)

(52) U.S. Cl. ............ 358/1.15; 358/1.13; 358/1.18; 358/1.9; 358/504; 358/3.27; 715/255

(58) Field of Classification Search ............. 358/1.15, 358/1.13, 1.18, 1.9, 504, 3.27; 715/255
See application file for complete search history.

(56) References Cited

U.S. PATENT DOCUMENTS

| | | | |
|---|---|---|---|
| 5,715,441 A | 2/1998 | Atkinson et al. | 395/601 |
| 5,761,684 A | 6/1998 | Gibson | 707/515 |
| 6,111,655 A | 8/2000 | Kashihara et al. | 358/1.18 |
| 6,378,983 B1 | 4/2002 | Ito et al. | 347/43 |
| 7,120,634 B2 | 10/2006 | Jecha et al. | 707/9 |
| 7,345,789 B2 | 3/2008 | Miyamoto | 358/3.06 |
| 7,589,851 B2 * | 9/2009 | De Bie et al. | 358/1.15 |
| 7,847,956 B2 * | 12/2010 | Farrell et al. | 358/1.13 |
| 7,898,696 B2 * | 3/2011 | Marchesotti et al. | 358/3.27 |
| 2003/0128392 A1 * | 7/2003 | O'Brien et al. | 358/1.18 |
| 2004/0199865 A1 * | 10/2004 | Bie et al. | 715/500 |
| 2006/0044612 A1 * | 3/2006 | Kayama | 358/1.15 |
| 2007/0008594 A1 * | 1/2007 | MacDonald et al. | 358/504 |
| 2007/0165258 A1 * | 7/2007 | Farrell et al. | 358/1.13 |
| 2008/0180729 A1 * | 7/2008 | LaVigne et al. | 358/1.15 |
| 2008/0239366 A1 * | 10/2008 | Cyman et al. | 358/1.15 |
| 2008/0278744 A1 * | 11/2008 | Marchesotti et al. | 358/1.15 |
| 2009/0290186 A1 * | 11/2009 | Rocas | 358/1.15 |
| 2010/0060909 A1 * | 3/2010 | Conescu et al. | 358/1.9 |
| 2010/0103445 A1 * | 4/2010 | Levine et al. | 358/1.15 |

* cited by examiner

*Primary Examiner* — Charlotte M Baker
*Assistant Examiner* — Rury Grisham
(74) *Attorney, Agent, or Firm* — Luis M. Ortiz; Kermit D. Lopez; Ortiz & Lopez, PLLC

(57) ABSTRACT

A system and method for configuring a pre-concatenation execution mode for an automated prepress process node. A set of prepress operations can be defined and a multi-part job moved from one prepress operation to next in a determined workflow execution path in response to receiving the multi-part job. Each individual part associated with the multi-part job can be processed as a single entity at each prepress operation. A concatenation node associated with the workflow execution path concatenates the individual processed job parts associated with the multi-part job into a single PDL entity. Such a single coherent approach to process the multi-part jobs before concatenation into the single PDL provides greater and easier flexibility in programming customization options.

20 Claims, 6 Drawing Sheets

PRE-CONCATENATION EXECUTION METHOD AND SYSTEM FOR AUTOMATED PREPRESS PROCESS NODES

TECHNICAL FIELD

Embodiments are generally related to rendering devices and techniques. Embodiments also relate in general to the field of computers and similar technologies, and in particular to software utilized in this field. In addition, embodiments relate to prepress workflows.

BACKGROUND OF THE INVENTION

The creation of rendered documents often involves many production and finishing steps that are highly variable with respect to each print job. In general, production and finishing operations can be grouped into a number of phases, including creating document information, performing prepress operations that render the document in a form suitable for printing, rendering the information onto some form of media, and compiling the selected media into a completed document. Such operations often include many sub-phases and the entire process may vary from one that is relatively simple to those that are extremely complex.

In prepress rendering operations, a computer may be utilized to produce, edit, and layout the text, logos, images, pictures, illustrations, and other data parts composing the printed product, and then output an edited layout data in a set of data described in a PDL (Page Description Language). The PDL can be processed and sent to an output device such as, for example, a digital printer for recording on paper or the like. Such prepress processing operations, however, possess limitations regarding the placement of a concatenation node and the operability of individual prepress operations in an automated prepress workflow.

Different prepress operations may access different levels of information related to multi-part jobs and have the ability to perform varying types of manipulations. Such manipulations can be performed more or less easily based on whether the information required is available in the job description. Such variations can lead to potentially incompatible and incoherent behavior, which must be resolved in order to enable the desired workflow flexibility. Consequently, there is a need for a single coherent approach for processing such multi-part jobs in order to provide increased efficiency for the automated prepress workflows.

Based on the foregoing, it is believed that a need exists for an improved system and method for configuring a pre-concatenation execution mode for an automated prepress process node in order to enable the desired workflow flexibility, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring a rendering device such as, for example, a standalone prepress automation system that possesses the ability to perform different operations on each of the components of a multi-part job.

It is another aspect of the present invention to provide for a method, system, and computer-usable medium for configuring a pre-concatenation execution mode for automated prepress process nodes.

It is a further aspect of the present invention to provide for a method and system for providing a single coherent approach for processing multi-part jobs to enable desired workflow flexibility.

The aforementioned aspects and other objectives and advantages can now be achieved as described herein. A system and method for configuring a pre-concatenation execution mode for an automated prepress process node is disclosed. Note that as utilized herein, the acronym PDL generally refers to "Page Description Language".

A set of prepress operations can be defined and a multi-part job (e.g., print job) can be moved from one prepress operation to the next in a determined workflow execution path in response to receiving the multi-part job. Each individual part associated with the multi-part job can be processed as a single entity at each prepress operation. A concatenation node associated with the workflow execution path concatenates the individual processed job parts associated with the multi-part job into a single PDL entity thereby improving operability of individual prepress operations in the automated workflow. Such a single coherent approach to process the multi-part jobs before concatenation into the single PDL provides greater and easier flexibility in programming customization options. The processing mode allows individual parts of the multi-part job to be treated independently by one or more prepress processing steps (e.g., annotation, imposition, page numbering, barcode additions, etc.). The concatenation of individual parts can be explicitly programmed by an operator as a part of the workflow and the concatenation node can be placed anywhere in the workflow.

The automatic redefinition of job properties (e.g., number of pages, page range selections, exception programming in general, etc.) can be applied to specific subsets of the multi-part job. Such an approach can be utilized to select subset of document pages for editing, to define page exception programming, and to determine the execution of imposition. Also, such an approach in association with a runtime variable can be utilized in various annotation forms such as watermarks, page numbers, bates stamping, and barcodes. The proposed system enables the automated production of a number of documents and manipulation of the documents to support more sophisticated offline finishing. The system is also capable of providing a mechanism that enables adaptive processing for a large range of prepress operations when executing complex jobs and enables sophisticated automation without any requirements in an upstream content management system.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope of such embodiments.

Figure 1:
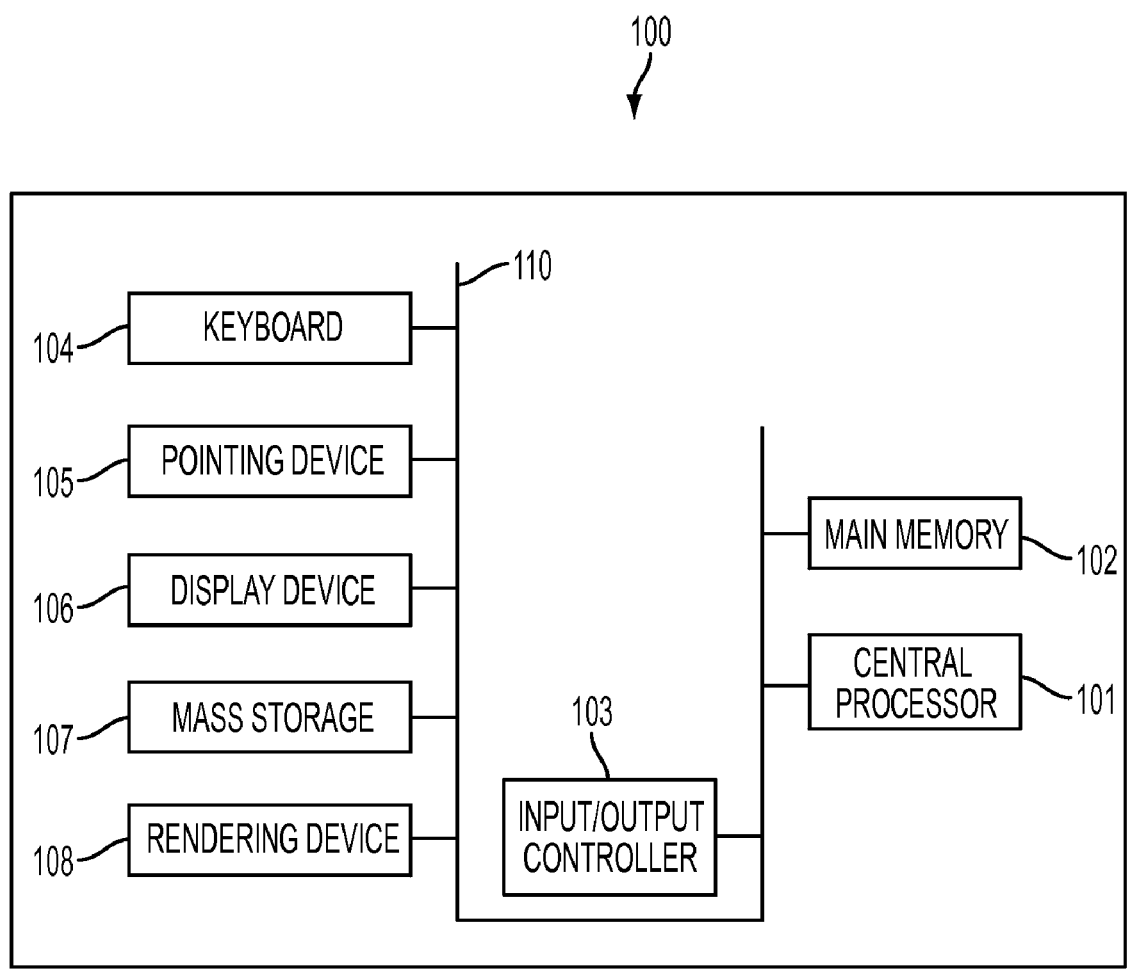
FIG. 1 illustrates a data-processing system in which the present invention may be embodied.
Figure 2:
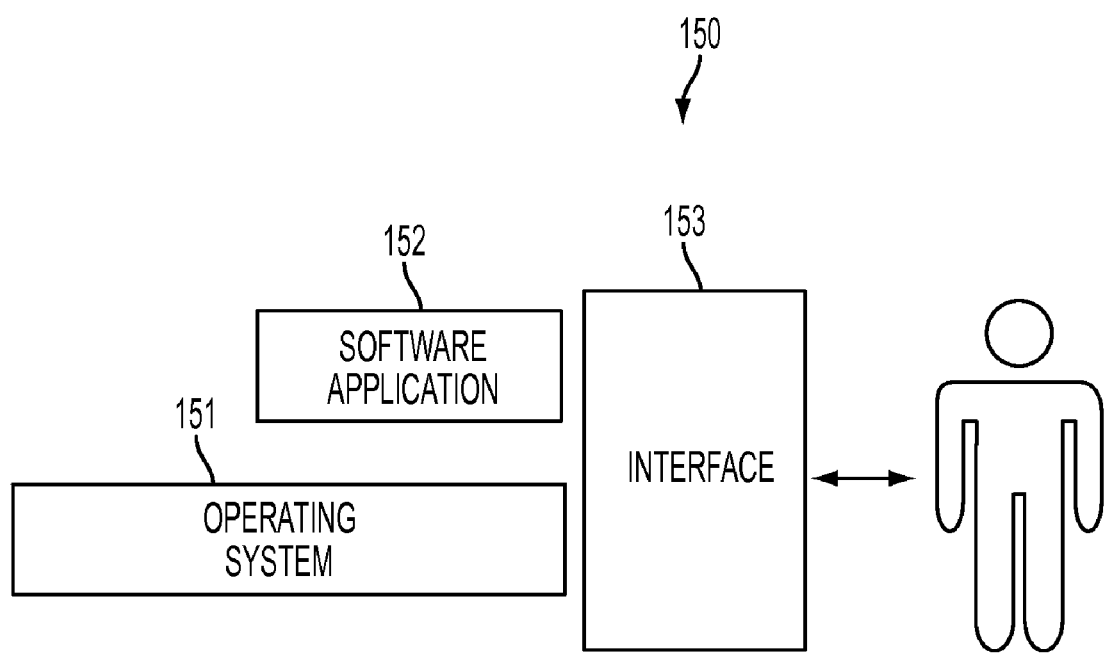
FIG. 2 illustrates a schematic view of a software system including an operating system, application software, and a user interface for carrying out the present invention.
Figure 3:
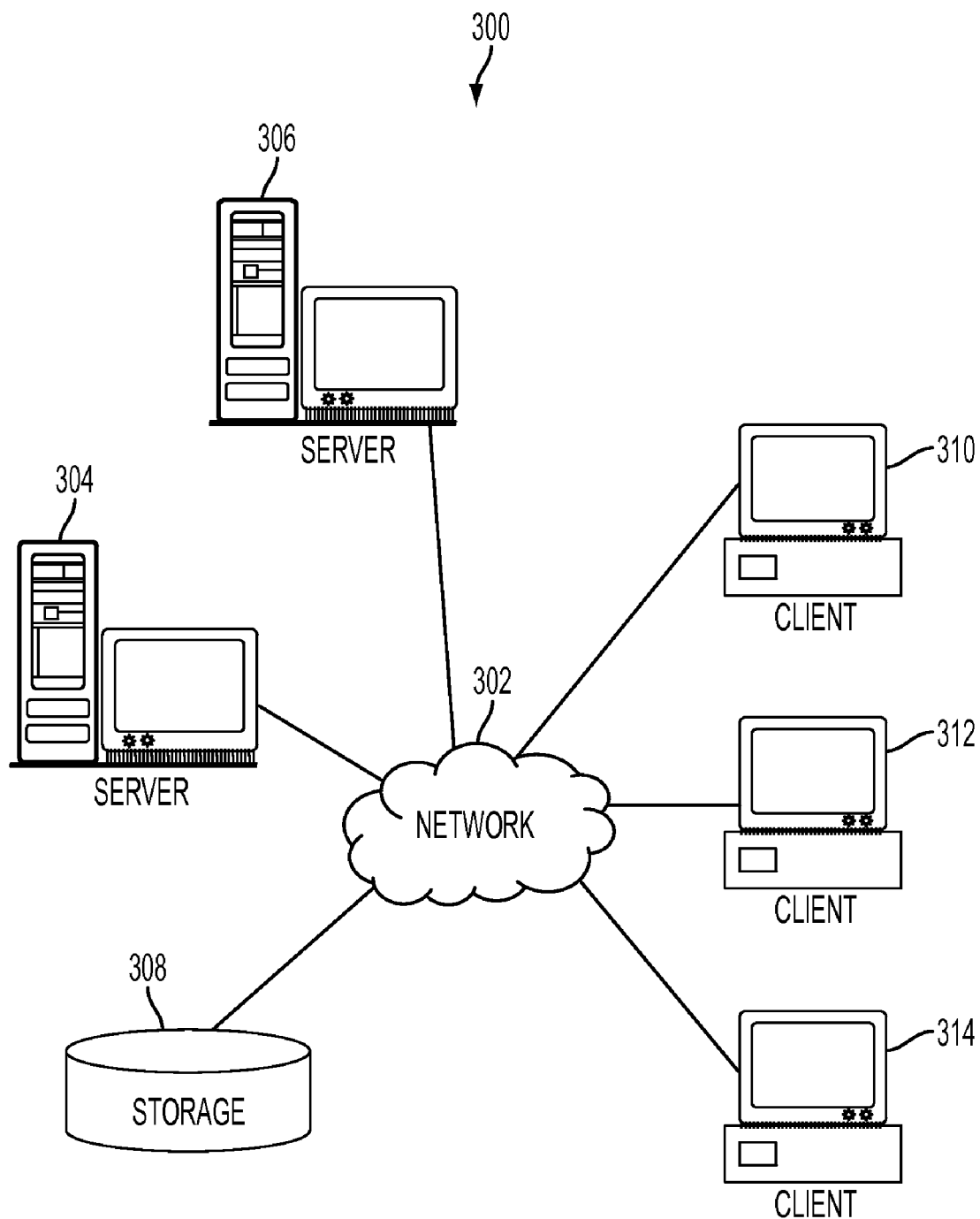
FIG. 3 depicts a graphical representation of a network of data processing systems in which aspects of the present invention may be implemented.

FIGS. 1-3 are provided as exemplary diagrams of data processing environments in which embodiments of the present invention may be implemented. It should be appreciated that FIGS. 1-3 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied and/or implemented in the context of a data-processing system 100 that generally includes a central processor 101, a main memory 102, an input/output controller 103, an input device such as, for example, a keyboard 104, a pointing device 105 (e.g., mouse, track ball, pen device, or the like), a display device 106, and a mass storage 107 (e.g., hard disk). Additional input/output devices, such as a rendering device 108, may be utilized in association with the data-processing system 100 as desired. As illustrated, the various components of the data-processing system 100 communicate through a system bus 110 or similar architecture.

Illustrated in FIG. 2, a computer software system 150 is provided for directing the operation of the data-processing system 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing system 100. The data-processing system 100 receives user commands and data through user interface 153; these inputs may then be acted upon by the data-processing system 100 in accordance with instructions from operating module 151 and/or application module 152.

The interface 153, which is preferably a graphical user interface (GUI), also serves to display results, whereupon the user may supply additional inputs or terminate the session. In one particular embodiment, operating system 151 and interface 153 can be implemented in the context of a "Windows" system. In another embodiment, operating system 151 and interface 153 may be implemented in the context of other operating systems, such as Linux, UNIX, etc. Application module 152, on the other hand, can include instructions, such as the various operations described herein with respect to the various components and modules described herein such as, for example, the method 500 depicted in FIG. 5.

FIG. 3 illustrates a graphical representation of a network of data processing systems in which aspects of the present invention may be implemented. Network data processing system 300 is a network of computers in which embodiments of the present invention may be implemented. Network data processing system 300 contains network 302, which is the medium used to provide communications links between various devices and computers connected together within network data processing system 100. Network 302 may include connections such as wire, wireless communication links, or fiber optic cables.

In the depicted example, server 304 and server 306 connect to network 302 along with storage unit 308. In addition, clients 310, 312, and 314 connect to network 302. These clients 310, 312, and 314 may be, for example, personal computers or network computers. Data-processing system 100 depicted in FIG. 1 can be, for example, a client such as client 310, 312, and/or 314. Alternatively, data-processing system 100 can be implemented as a server such as servers 304 and/or 306, depending upon design considerations.

In the depicted example, server 304 provides data such as boot files, operating system images, and applications to clients 310, 312, and 314. Clients 310, 312, and 314 are clients to server 304 in this example. Network data processing system 300 may include additional servers, clients, and other devices not shown. Specifically, clients may connect to any member of a network of servers, which provide equivalent content.

In the depicted example, network data processing system 300 is the Internet with network 302 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational, and other computer systems that route data and messages. Of course, network data processing system 300 also may be implemented as a number of different types of networks such as, for example, an intranet, a local area network (LAN), or a wide area network (WAN). FIG. 1 is intended as an example and not as an architectural limitation for different embodiments of the present invention.

The following description is presented with respect to embodiments of the present invention, which can be embodied in the context of a data-processing system such as data-processing system 100 and computer software system 150 depicted respectively in FIGS. 1-2. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

Figure 4:
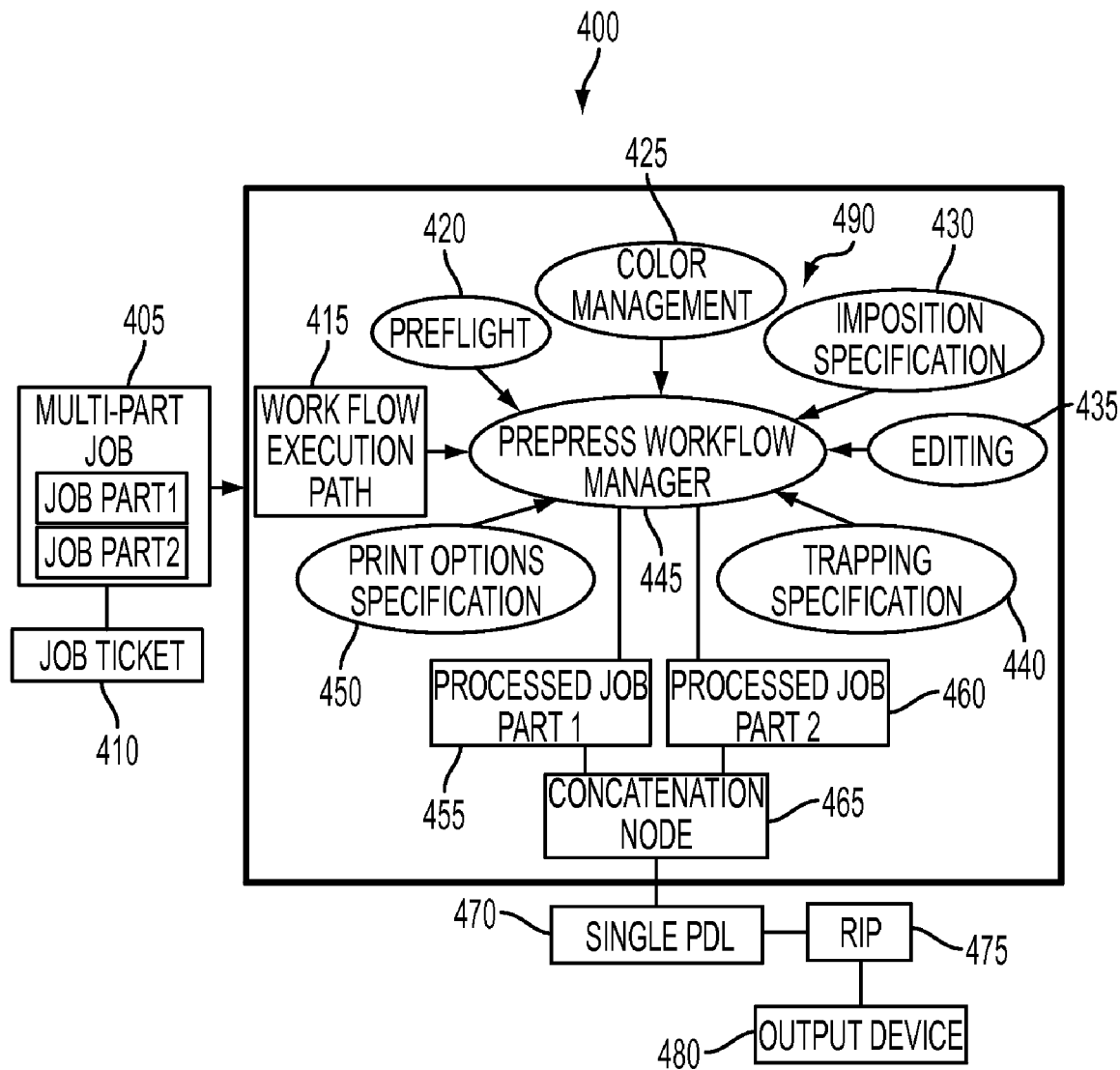
FIG. 4 illustrates a block diagram of a prepress workflow system for processing multi-part jobs, in accordance with a preferred embodiment.

FIG. 4 illustrates a block diagram of a prepress workflow system 400 for processing multi-part job 405, in accordance with a preferred embodiment. Note that in FIGS. 1-6, identical or similar blocks are generally indicated by identical reference numerals. The system 400 can be configured to include a prepress workflow manager 445 in association with a workflow execution path 415 for processing the multi-part job 405. The workflow execution path 415 may be configured to model and implement workflow for processes such as printing, production lines, or other industrial/business applications. The prepress workflow system 400 may interface with the data-processing system 100 and the rendering device 108.

The prepress workflow system 400 may be configured to manage the software applications, data, and respective hardware components (e.g., displays, disk drives, etc.) as well as providing a platform to execute one or more prepress operations 490 associated with the prepress workflow manager 445. As required, detailed embodiments of the present invention are disclosed herein; however, it is to be understood that the disclosed embodiments are merely exemplary of the invention that may be embodied in various and alternative forms. It should be readily apparent to those of ordinary skill in the art that the system 400 depicted in FIG. 4 represents a generalized schematic illustration and that other components may be added or existing components may be removed or modified.

The prepress workflow manager 445 can be configured to include one or more prepress process nodes 490 such as, a preflight section 420, a color management section 425, an imposition specification 430, an editing section 435, a trapping specification 440, and a print options specification 450. The prepress workflow manager 445 may be configured to manage associations between the prepress process nodes 490. The multi-part job 405 can be moved from one prepress operation to the next in the determined workflow execution path 415 in response to receiving the multi-part job 405.

The multi-part job 405 generally includes multiple PDL files. A document can be created in a page layout program and saved directly to a PDL format. PDL generally refers to a computer language designed for describing how type and graphic elements can be produced by an output device (e.g., a printer). Note that "PostScript", developed by Adobe Systems, Inc., is one example of a widely adopted PDL that can be utilized to specify the contents of a page that is to be printed. PostScript is a registered trademark of Adobe Systems, Inc. Each PostScript file is a purely text-based description of a page which utilizes the ASCII character set and which can be generated on every widely used operating system. The PDL file may be a PostScript file. The PDL file represents a multiple-page document file that can be created by assembling a collection of page files.

Each individual part associated with the multi-part job 405 can be processed as a single entity at each prepress operation 490. The workflow manager 445 automatically reads the job ticket 410 and redirects the multi-part job 405 for processing based on output requirements, priority, and so on. The multi-part job 405 can be automatically routed via the determined workflow execution path 415 to a preflight section 420, where a report can be generated listing all the fonts, images, graphics, document components, and the approximate print time.

Next, color correction 425 can be applied to the multi-part job 405, or individual images, as necessary. The file may be tagged with a proper ICC profile for both proofing and/or final output. Such a process can be automated by the workflow manager 445 as directed in the job ticket 410. The multi-part job 405 can then be imposed for final output. Next, the prepress operator applies trapping 440 or specifies trapping controls, and the trapping occurs in the RIP (Raster Image Processor) 475. A raster image processor (RIP) is a component used in a printing system which produces a raster image also known as a bitmap. The bitmap is then sent to a printing device for output. The input may be a page description in a high-level page description language such as, for example, PostScript, Portable Document Format, XPS or another bitmap of higher or lower resolution than the output device. In the latter case, the RIP can apply either smoothing or interpolation algorithms to the input bitmap to generate the output bitmap. Raster image processing (i.e., "RIPping") is the process and the means of turning vector digital information such as a PostScript file into a high-resolution raster image.

Finally, post-press operations can be specified for the job 405 before final output. A concatenate node 465 associated with the workflow execution path 415 concatenates individual processed job parts 455 and 460 associated with the multi-part job 405 into a single PDL entity 470. Such a single coherent approach processes multi-part job 405 before concatenation into the single PDL 470 thereby providing greater and easier flexibility in programming customization options. The processing mode 490 allows individual parts of the multi-part job 405 to be treated independently by one or more prepress processing step (e.g., annotation, imposition, page numbering, barcode additions, etc.).

The RIP 475 can be configured to receive image data which is typically in the form of the PDL. The RIP is said to "rasterize" the PDL image file by performing operations such as image screening, color separating, imposition, trapping and various other prepress image preparation operations 490 upon the PDL image data 470 to yield raster image data in bitmap format. The raster image data is then transferred to an output device 480 in order to provide an efficient data transfer rate, thereby, keeping the output device 480 operating at a desired operating speed. The prepress workflow manager 445 can be configured to control RIPing and output workflow and for providing more flexible operating and expansion options to a prepress customer.

The output device 480 may include any output devices, which can be utilized in a printing environment, such as a printer, a print engine, a proofer, a film setter, an image setter, a plate maker, or a computer-to-plate system. The output device 480 generates raster bitmap image data representing halftone or otherwise screened images for reproduction by a printing press. With reference to FIG. 4, portions of the system 400 suitable for incorporating concepts of the present application are shown. Only portions of the system 400 that facilitate an understanding of the present application are shown. It is to be understood that although the present application is described in terms of a rendering system, the concepts described herein are equally suitable for other systems having a finishing system.

Figure 5:
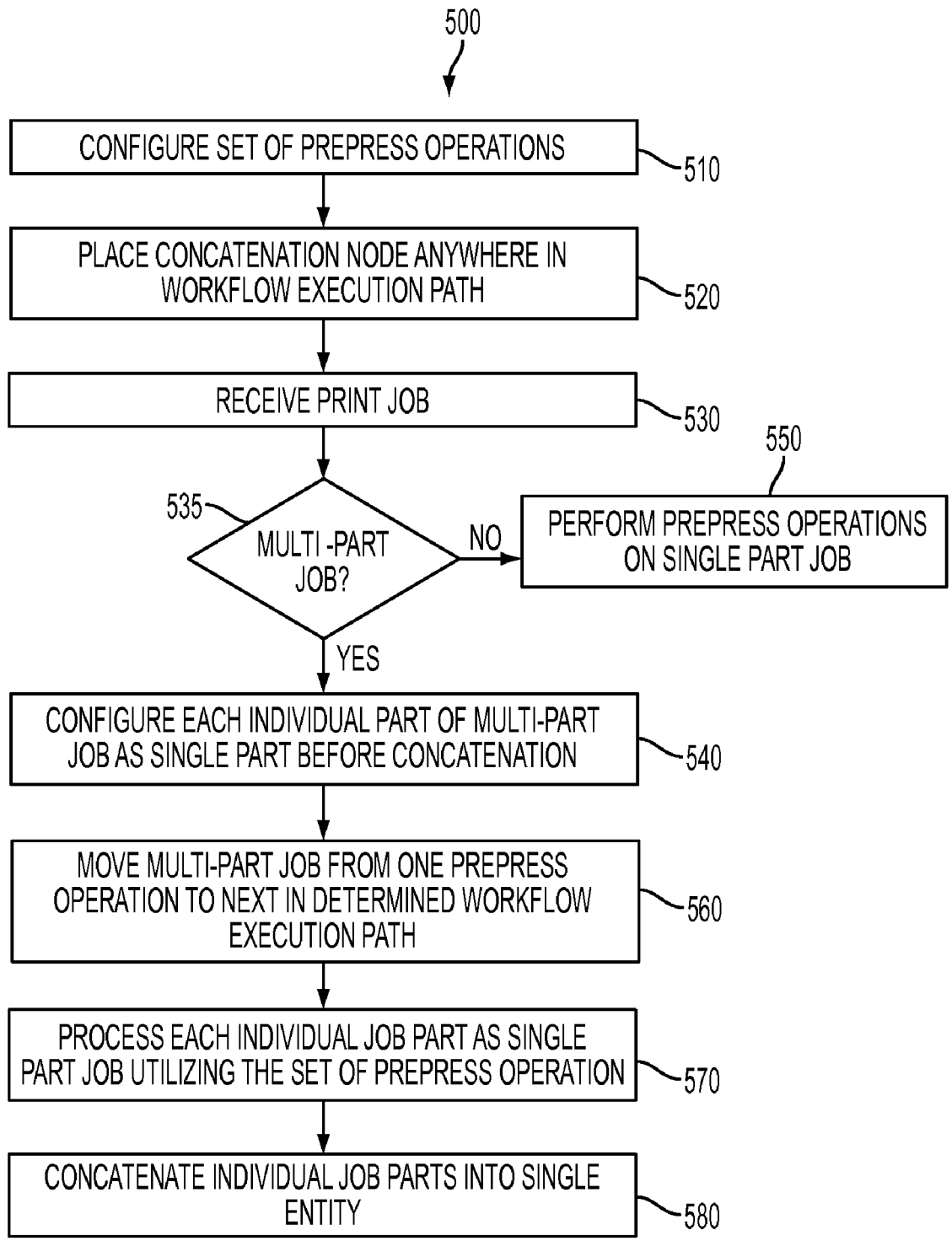
FIG. 5 illustrates a high level flow chart of operations illustrating logical operational steps of a method for processing multi-part jobs before concatenation into a single PDL, in accordance with a preferred embodiment.

FIG. 5 illustrates a high level flow chart of operations illustrating logical operational steps of a method 500 for processing multi-part jobs 405 before concatenation into the single PDL 470, in accordance with a preferred embodiment. Note that the method 500 can be implemented in the context of a computer-useable medium that contains a program product. The method 500 depicted in FIG. 5 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 500 described herein can be deployed as process software in the context of a computer system or data-processing system as that depicted in FIGS. 1-3.

The set of prepress operations 490 as depicted in FIG. 4 can be defined, as depicted at block 510. The concatenation node 465 can be placed anywhere in the workflow execution path 415 while configuring the prepress operations 490, as illustrated at block 520. Thereafter, as indicated at block 530, a rendering job (e.g., print job) can be received. A determination can be made whether the received job is a multi-part job comprising multiple PDL files, as depicted at block 535. If the received job comprises a multi-part job 405, the individual job parts associated with the multi-part job 405 can be configured as a single part job before concatenation, as depicted at block 540. Otherwise, the prepress operations 490 associated with the prepress manager 445 can be performed on the single part job, as depicted at block 550.

Figure 6:
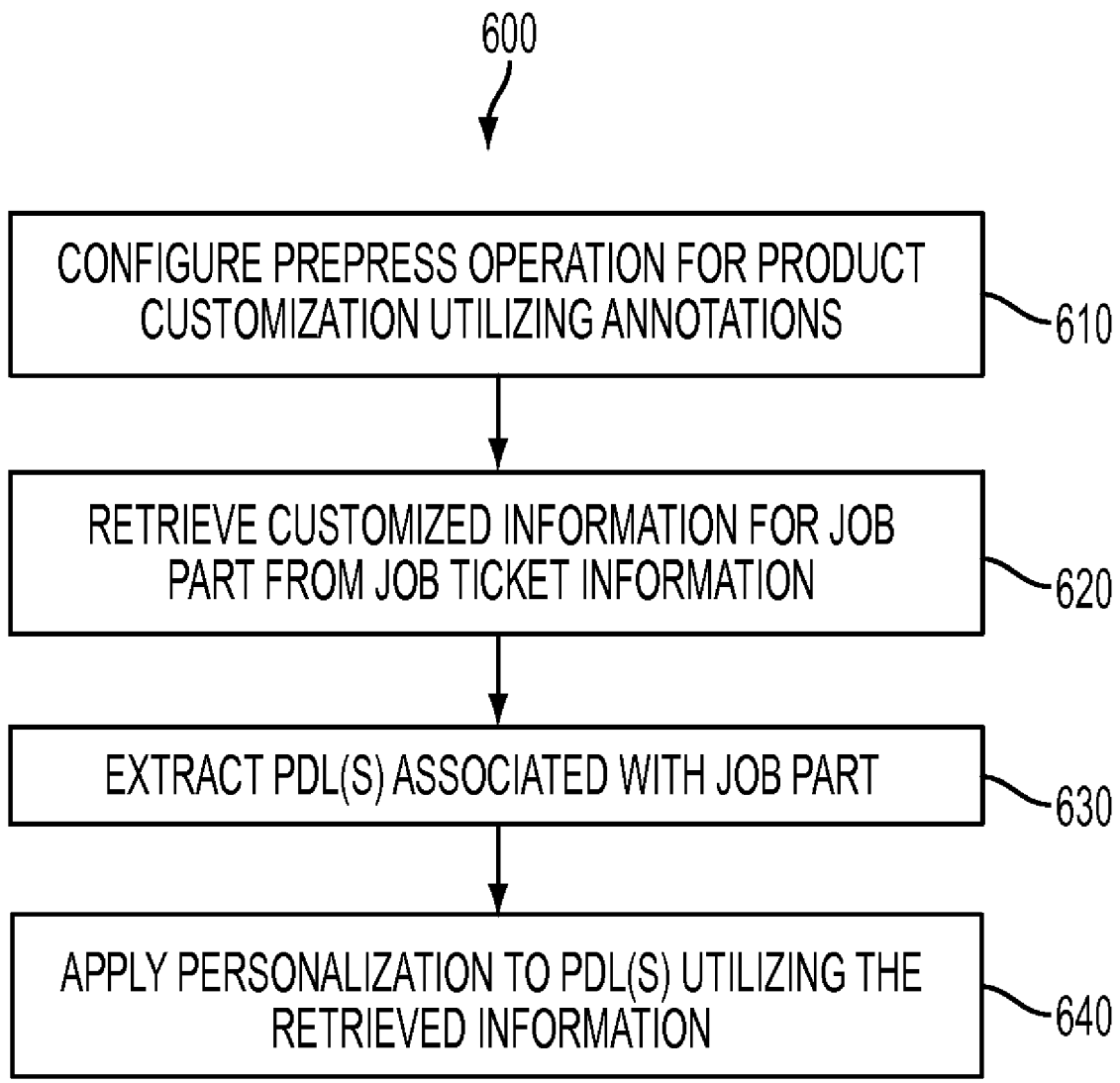
FIG. 6 illustrates a detailed flow chart of operations illustrating logical operational steps of a method for performing product customization, which can be implemented in accordance with an exemplary embodiment.

The multi-part job 405 can be moved from one prepress operation to the next in the determined workflow execution path 415, as illustrated at block 560. Each individual job part associated with the multi-part job 405 can be processed as a single part job at each prepress operation, as illustrated at block 570. The exact nature of such processing can be dependent on the prepress operation 490. For example, consider performing product customizing for the multi-part job 490, as illustrated in FIG. 6. A prepress operation can be configured for product customization utilizing a number of annotations, as depicted at block 610. Thereafter, customized information for the job parts can be retrieved from job ticket information 410, as depicted at block 620. The customized information for the job part can be received from either a portion of the job ticket applied to a specific job part (e.g., a personalized name applied to a specific book), or the overall job ticket information (e.g., a shipping name & address). Thereafter, PDL(s) associated with the job parts can be extracted, as depicted at block 630.

Next, as depicted at block 640, personalization can be applied to the PDL(s) utilizing the retrieved information. If the personalization includes behavior that is based on the structure of the job, that job can also be performed as if the single PDL is the entire job. If the annotations can be defined for the first and last page of the job, the annotation can be applied to the first and last page of the PDLs in the job part. If annotations are specified for even pages, they can only be applied to the even pages of the PDLs in the job part. Finally, the individual processed job parts 455 and 460 can be concatenated into the single PDL 470 utilizing the concatenation node 465, as depicted at block 580.

The system 400 enables customization of jobs within production units (aggregation of jobs that share production requirements) without requiring an upstream system to submit each item in a production unit separately. For example, the addition of customer information to the documents that will eventually be ganged into cut and stack batches for offline finishing utilizes the same binder configuration. Similarly, the addition of integrity barcodes to jobs that can be concatenated to enable better throughput during spool, RIP, and print. Such barcodes often utilize runtime variables whose values are dependent on job characteristics. The automatic redefinition of such variables to match the characteristics of a specific job part can enable use of a single barcode definition for all jobs in a production unit.

The system 400 can enable customization of multi-part documents where each of the parts is capable of being treated as a discrete job. For example, the addition of "chapter numbering" (n of m page numbering that resets at every chapter) to a customized manual or course pack. The definition of a single exception page programming range (e.g., simplex, heavy weight media front covers) that can be applied to all sections of manuals with different characteristics. Such an approach will enable use of a single set of media programming defaults to perform adaptive exception page programming where the exact page ranges for the completed document vary according to, for example, how many pages there are in the individual PDFs that comprise job parts. Note that as utilized herein, the acronym PDF generally refers to "Portable Document Format" which is a file format for document exchange.

The system 400 also enables manipulation of documents to support more sophisticated offline finishing, inline finishing, or online finishing as well. For example, perfect bound books rendered on CF rendering engines are often rendered utilizing fairly large layouts that may include folded signatures with 16 or even 32 pages per signature (e.g., utilizing accordion folding). Preparation of such type of imposition is often done by hand because if there's a "short" signature in a book it can be placed near the center of the book since the bind in such pages is often weaker than the bind in larger signatures. Note that a 112-page book imposed utilizing 16up folded signatures (with 32 pages per folded piece of paper) can be converted into three 16up (32 input page) signatures and one "short" 8up (16 input pages) signature. The last signature cannot be at the end of the book because it can have weaker pages.

The book can be prepared by defining a 4-part job utilizing the method 500. The first 2 parts can have 32 pages each, the next part can have 16 pages and the last part can have 32 pages. The imposition process node 430 can then be configured to do accordion saddle stitching. The imposition can be executed on each job part by considering each job part, which results in the correct imposition for the entire book. Other similar jobs can be prepared for imposition by defining job parts. Such an approach 500 provides a means for enabling automation for a large number of jobs and does not place an undue burden on content management systems.

The automatic redefinition of job properties (e.g., number of pages, page range selections, exception programming in general, etc.) can be applied to specific subsets of the job 405. The method 500 described herein can be utilized to select subset of document pages for editing, to define page exception programming, and to determine the execution of imposition. Also, such an approach in association with runtime variables can be utilized in various annotation forms such as watermarks, page numbers, bates stamping, and barcodes.

The proposed system 400 enables the automated production of a number of documents and manipulation of documents to support more sophisticated offline finishing. The system 400 is also capable of providing a mechanism that enables adaptive processing for a large range of prepress operations when executing complex jobs and enables sophisticated automation without putting requirements in an upstream content management system. Such a separation of job customization programming can be configured from the specification of production units and provides greater and easier flexibility in programming customization.

While the present invention has been particularly shown and described with reference to a preferred embodiment, it will be understood by those skilled in the art that various changes in form and detail may be made therein without departing from the spirit and scope of the invention. Further-more, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

The disclosed approach thus applies to a number of prepress operations such as, for example, imposition, annotations, barcodes, page exceptions programming, padding, and other prepress operations. The embodiments discussed herein thus permit programming of such prepress operations in a normal manner and then applying such programming to each of the parts of a multi-part job as if that job part was a discrete job. That is, the prepress operation is defined once and then applied to either the whole job or each job part, assuming the pre-concatenation portion of the workflow.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for configuring a pre-concatenation execution mode for prepress process nodes, comprising:
    transferring a multi-part job to at least one prepress workflow operation associated with a determined workflow execution path in response to receiving said multi-part job;
    processing an individual part associated with said multi-part job as a discrete job dependent on said at least one prepress workflow operation; and
    concatenating said individual part into a single page description language entity, thereby enabling a rules-based adaptive processing with respect to said at least one prepress workflow operation when executing said multi-part job.

2. The method of claim 1 wherein said multi-part job comprises at least one page description language file.

3. The method of claim 1 wherein transferring said multi-part job to at least one prepress workflow operation associated with said workflow execution path, further comprises:
    configuring said at least one prepress workflow operation with respect to at least one prepress process node associated with said workflow execution path.

4. The method of claim 1 further comprising:
    programming at least one pre-press workflow operation; and
    applying said programming of said at least one pre-press workflow operation to said individual part of said multi-part job.

5. The method of claim 4 further comprising applying said programming of said at least one pre-press workflow operation to said individual part of said multi-part job in a pre-concatenation portion of said workflow execution path.

6. The method of claim 1 further comprising:
    placing a concatenation node in said workflow execution path; and
    treating said individual part associated with said multi-part job as said discrete job prior to concatenation.

7. The method of claim 6 further comprising configuring said concatenation node to enable manipulation of said multi-part job to support offline finishing or online finishing thereof.

8. The method of claim 1 wherein transferring said multi-part job to at least one prepress workflow operation associated with said workflow execution path, further comprises:
    configuring a single coherent approach for processing said multi-part job before said discrete job associated with said multi-part job is concatenated into said single page description language entity, thereby allowing for a separation of job customization programming from a specification of production unit.

9. A system for configuring a pre-concatenation execution mode for prepress process nodes, said system comprising:
    a processor;
    a data bus coupled to the processor; and
    a computer-usable medium embodying computer code, the computer-usable medium being coupled to the data bus, the computer program code comprising instructions executable by the processor and configured for:
        transferring a multi-part job to at least one prepress workflow operation associated with a determined workflow execution path in response to receiving said multi-part job;
        processing an individual part associated with said multi-part job as a discrete job dependent on said at least one prepress workflow operation; and
        concatenating said individual part into a single page description language entity, thereby enabling a rules-based adaptive processing with respect to said at least one prepress workflow operation when executing said multi-part job.

10. The system of claim 9 wherein said multi-part job comprises at least one page description language file.

11. The system of claim 9 wherein said instructions for transferring said multi-part job to at least one prepress workflow operation associated with said workflow execution path are further configured for:
    configuring said at least one prepress workflow operation with respect to at least one prepress process node associated with said workflow execution path.

12. The system of claim 9 wherein said instructions are further configured for:
    programming at least one prepress workflow operation; and
    applying said programming of said at least one prepress workflow operation to said individual part of said multi-part job.

13. The system of claim 12 wherein said instructions are further configured for applying said programming of said at least one prepress workflow operation to said individual part of said multi-part job in a pre-concatenation portion of said workflow execution path.

14. The system of claim 9 wherein said instructions are further configured for:
    placing a concatenation node in said workflow execution path; and
    treating said individual part associated with said multi-part job as said discrete job prior to concatenation.

15. The system of claim 14 wherein said instructions are further configured for permitting said concatenation node to enable manipulation of said multi-part job to support offline finishing for online finishing thereof.

16. A non-transitory computer-usable medium for configuring a pre-concatenation execution mode for prepress process nodes, said computer-usable medium embodying computer program code, said computer program code comprising computer executable instructions configured for: transferring a multi-part job to at least one prepress workflow operation associated with a determined workflow execution path in response to receiving said multi-part job; processing an individual part associated with said multi-part job as a discrete job dependent on said at least one prepress workflow operation; and concatenating said individual part into a single page description language entity, thereby enabling a rules-based adaptive processing with respect to said at least one prepress workflow operation when executing said multi-part job.

17. The non-transitory computer-usable medium of claim 16 wherein said multi-part job comprises at least one page description language file.

18. The non-transitory computer-usable medium of claim 16 wherein said embodied computer program code further comprises computer executable instructions configured for configuring said at least one prepress workflow operation with respect to at least one prepress process node associated with said workflow execution path.

19. The non-transitory computer-usable medium of claim 16 wherein said embodied computer program code further comprises computer executable instructions configured for: placing a concatenation node in said workflow execution path; and treating said individual part associated with said multi-part job as said discrete job prior to concatenation.

20. The non-transitory computer-usable medium of claim 19 wherein said embodied computer program code further comprises computer executable instructions configured for permitting said concatenation node to enable manipulation of said multi-part job to support offline finishing or online finishing thereof.

* * * * *